United States Patent

[11] 3,609,321

[72] Inventor Richard Hood Campbell, Jr.
Gilford, N.H.
[21] Appl. No. 814,350
[22] Filed Apr. 8, 1969
[45] Patented Sept. 28, 1971
[73] Assignee Pneumo Dynamics Corporation
Cleveland, Ohio

[54] TAPE INPUT CONTROL SYSTEM FOR MACHINE TOOL
14 Claims, 5 Drawing Figs.

[52] U.S. Cl.............................................235/151.11,
318/604, 318/636, 318/590
[51] Int. Cl.............................................G06f 15/46,
G06f 15/20, G06g 7/48
[50] Field of Search......................................235/151.11,
604; 318/636

[56] References Cited
UNITED STATES PATENTS
3,486,012  12/1969  Burnett et al.................  235/151.11

Primary Examiner—Eugene G. Botz
Attorney—Stephen M. Mihaly

ABSTRACT: A control system for a multiple-spindle automatic machine having a plurality of reciprocable tool-bearing slides which are simultaneously operable, wherein seriate position information for each slide, contained on a preprogrammed tape, is converted to continuous signals for control of position loop servos which actuate the slides. Sample and hold circuits receive discrete difference position information and maintain same for application to integrator circuits which develop the continuous control signals. Introduction of input information occurs on a variable time basis dependent upon the programmed operating characteristics of the integrator circuits which in turn provide the variations of the control signals and thus control the rates of movement of the slides. Integrated circuit and solid state component technology is utilized throughout the control system which features a unique sample and hold circuit.

3,609,321

TAPE INPUT CONTROL SYSTEM FOR MACHINE TOOL

BACKGROUND OF THE INVENTION

This invention relates to automatic control systems and more particularly to a control system having a continuous tape input, specially suited for control of the functions of an automatic machine tool. Such control systems have become commonplace in the art where it is desired to effect a more reliable and accurate operation of the machine tool than obtainable by manual or semiautomatic machining methods and to provide a degree of versatility which cannot be matched by these prior art systems. More and more emphasis has been placed recently on the completely automatic operation of the machine tool, except for the necessary work loading and tooling set up functions of an operator, whereby complete machining operations can be programmed at a remote location and stored for utilization at any desired time. Under such theory of operation it is possible for a programmer to take the necessary time to determine optimum cutting feeds and speeds and fully utilize his technical proficiency in machining techniques to realize an optimum efficiency of the machine within its full capability.

In regard to efficiency especially, much effort has been directed toward using one particular type of machine tool for a corresponding type of machining operation and the adaptability requirements of such tools have not been stringent. However, it has become clear that in many instances machine tools of a specific type may be a burden on a factory or shop in limiting the types of work which may be efficiently performed. There is much need for a machine having sufficient capability and versatility to accommodate a wide range of types of machining operations so that such machine in conjunction with a form of automatic control may be programmed for optimum utilization.

Automatic control systems in the past have fallen generally into two main categories, these being the digital and analog forms of control where, in the former, the desirability of handling information in a digital form is made compatible with the continuous type of movement encountered in the typical machining operation. While a pure analog form of control is economical in requiring only a minimum of components for converting input information into the utilizable machine motion, the digital system has found greater acceptance as providing a greater degree of accuracy and greater facility for the programmer or operator who must control the machine tool. The digital system of course, is limited in operating upon discrete quantities of information and must have sufficient capacity to perform the necessary computations within the system.

SUMMARY OF THE INVENTION

Therefore, it is an object of this invention to provide a control system which combines the advantages of the digital and analog type systems in utilizing the digital form of storage of information with the analog combination of signals therein for control purposes.

It is another object of this invention to provide an improved control system especially suitable for machine tools which system utilizes a continuous form of control signal generated from discrete blocks of input information.

It is still another object of this invention to provide an improved control system for machine tools which utilizes a continuous punched tape as the storage medium, access to the tape information being synchronized with development of the control signal within the system.

It is yet another object of this invention to provide an improved tape control system for machine tools which is especially suitable for machine tools having a plurality of simultaneously operable machining elements, such as the conventional multispindle automatic machine, wherein each slide movement is correlated with one another and yet is independently controlled, receiving information commonly from the input medium.

It is yet another object of this invention to provide an improved tape control system embodying a conversion from digital to analog information wherein a rate generator is employed for developing a control signal, the rate generator operating in a variable mode as directed by input command information.

It is a yet further object of this invention to provide an improved control system wherein serial position information contained an a continuous punched tape medium is converted to a continuous signal by a unique sample and hole circuit arrangement featuring a minimum sampling interval and a high quality of maintained signal.

It is a further object of this invention to provide an improved tape control system for application with machine tools which is susceptible of great versatility in programming and yet is economically advantageous requiring only a minimum of information handling components.

It is a yet further object of this invention to provide an improved tape control system utilizing only solid-state components in integrated and discrete forms and obviating the necessity for mechanical switching devices.

DESCRIPTION OF THE PREFERRED EMBODIMENT

Figure 1:
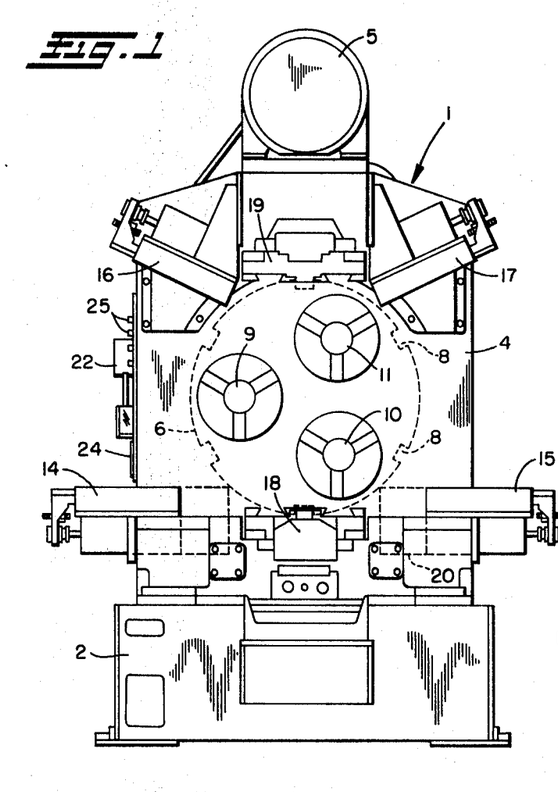
FIG. 1 is an end view of a multiple spindle machine tool especially suited for instrumentation with this control system, showing a plurality of actuatable slides in relation to three indexable spindles.

Referring now to FIG. 1 there is shown a machine tool 1 of the multiple spindle type which is particularly suited for application with the control system of the invention. The machine tool 1 comprises a base section 2 and a generally vertical head stock 4 having a motor 5 as the power source mounted at the top thereof. A spindle carrier 6 (schematically shown) is mounted for indexing movement with respect to the head stock 4 to a plurality of index stations as accurately determined by the setting of a shot pin (not shown) into one of the locating guides 8 on the spindle carrier 6. Three spindles 9-11 are mounted at equidistant locations on the spindle carrier 6 for rotation with respect thereto, each mounting in turn a workholding chuck for gripping of a workpiece.

As shown in FIG. 1, the spindles 9-11 define three index stations of the machine tool being respectively a work-loading station at the location of spindle 9 and two machining stations and it will be understood that the spindle carrier 6 is indexable in 60° increments to define three additional index stations wherein the spindles 9-11 are equidistantly located at positions intermediate those shown in FIG. 1. Suitable gearing and transmissions provide the indexing movement of the spindle carrier 6 and the rotation of spindles 9-11 by way of coupling to the motor 5, such devices not being shown as they are well understood by those skilled in this art. However, it should be noted that the transmissions controlling the speeds of the spindles 9-11 in all of the index stations are automatically shiftable by means of electric clutches or the like to provide preselected speeds of rotation. It will be pointed out in greater detail hereinafter that such spindle speed selection is made by the programmer when setting up the machine and the information is carried a portion of the input information for application to the appropriate spindle drives at various times within the machining cycle.

The machine tool further comprises a plurality of reciprocable slides 14–19 adapted for linear movement with respect to the workpieces and spindles 9–11 of the machine tool for performing machining operations. The slides 14–19 comprise a movable portion mounted on a base portion fixed to the machine tool 1 and restricted to linear movement by a dovetail mating arrangement or the like, being actuated by a piston-cylinder combination, preferably of the hydraulic type.

The six slides 14–19 of this machine tool consist of two transverse slides 14, 15 reciprocable along a generally horizontal line, two transverse slides 16, 17 mounted at a substantial angle to the horizontal and above the spindle carrier 6 and two end working slides 18, 19 adapted for linear reciprocation parallel to the axes of the spindles 9–11 and mounted respectively below and above the spindle carrier. It will be appreciated that each of the slides is adapted for the mounting of tooling thereon for cooperation with workpieces carried by the chucks on the spindles 9–11 at the various index locations, save for the work loading station where no machining is performed.

Each of the slides 14–19 is movable between a fully retracted position as shown, for example, in full lines for slide 15 at the lower right-hand portion of the machine tool 1 and a "full-in" position as indicated by the dashed lines 20. The "full-in" position is a precise location for slide 15 and is achieved by the abutment of the movable portion of the slide with a stop block (not shown) rigidly fixed to the machine tool 1. In the usual machine practice for this type of machine tool, it would be characteristic to start each of the slides 14–19 from a fully retracted position in each cycle and perform a movement to the full-in position, typically incurring a change in rate of movement during such stroke to provide a rapid transverse movement to a machining area and a further movement at a lower rate of speed to provide a "feed" velocity for metal removal procedures. The stop blocks will be abutted at the full-in positions so that all tooling mounted on the slides 14–19 may be referenced to the positions but as will be pointed out in greater detail hereinafter, under the control of the tape system of this invention, slide movement does not require engagement of the stop blocks and may be of any character including limited or multiple stroke movements.

A tape reader 22 is mounted at a control panel 24 on the left side of the machine tool 1 as viewed in FIG. 1 for controlling the automatic mode of operation wherein information relating to selection of spindle speeds and the program for the individual slide movement are available for conversion from the digital form contained on the punched paper tape to actual machine functions. Several other push buttons 25 are shown at the control panel 24, but other than the minimal start and stop buttons for energizing the tape control system, are required only for manual set up or checking of the machine tool.

Figure 2:
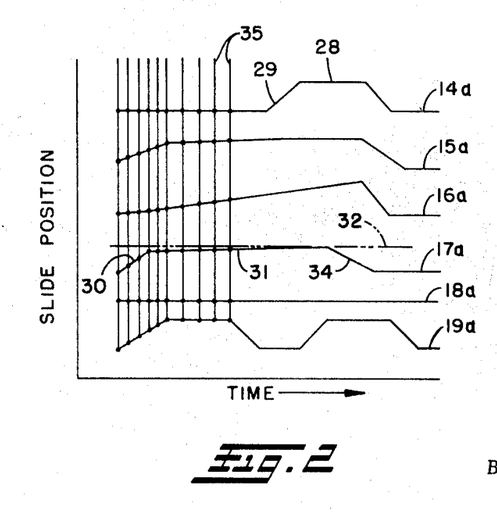
FIG. 2 is a graph representing the position of each of the slides of the machine tool with respect to time in a typical machining cycle.

Referring now to FIG. 2, an arbitrary description of one complete machining cycle of the machine tool is shown in graph form wherein positions of the slides 14–19 are plotted with respect to time from the start of the cycle as curves 14a–19. The slide positions indicated correspond to the fully retracted position at the initial point of each curve and the full-in position at the maximum points of the curves. The slope of the curves 14a–19a at any particular point indicate the rate of movement of the associated slide such that a horizontal line as at 28 indicates a stationary slide and a sloped line as at 29 indicates a slide moving at a particular velocity, the slope of the curve being proportional to the velocity. Thus, as previously mentioned curve 17a represents the conventional movement of the slide 17 for this type of machine tool wherein a high initial velocity or rate of movement is effected as indicated by the line 30, corresponding to a rapid transverse approach to the machining area, followed by a line 31 of only slight slope from the horizontal line 32 representing the feed movement of the slide through the machining area to an end or full-in position. Retraction of the slide at a rapid traverse rate is indicated by the line 34 having a negative slope, which may occur after a "dwell" interval at the full-in position, if desired.

The remainder of the curves in the graph of FIG. 2 depict various modes of operation of the various slides 14–19 ranging from no movement of slide 18 during the cycle to a double cycle movement of the slide 19 wherein movement to the full-in position occurs twice during the machining cycle. The curve 14a of slide 14 indicates that the forward motion of any slide toward the spindles 9–11 may occur at anytime within the cycle and is independent of the movement of the other slides. It will be pointed out in further detail, however, that the movements of all of the slides 14–19 are interrelated as indicated by the vertical lines 35 intersecting the curves 14a–19b since position information is received from the storage medium on a common basis. Thus, it will be apparent that in programming a cycle for the machine tool it will be necessary to determine the type of movement encountered by any one slide and program the other slides correspondingly. It is clear, however, that a simultaneous or even synchronous movement of the slides 14–19 may be effected since each discrete portion of each curve as defined by the vertical lines 35, occurs within an identical time interval and may have an identical or related slope.

Figure 3:
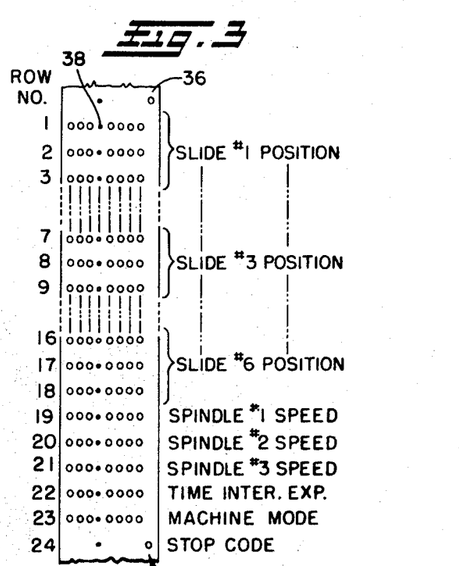
FIG. 3 is a plan view of a segment of the tape carrying machine function information and labeled as to the location of such information within a block of the tape.

Referring now to FIG. 3, there is shown a segment of the continuous tape 36 associated with the tape reader 22 which stores the programmed information for direction of movement of each of the slides 14–19 as well as for auxiliary controls including the spindle speeds, the time interval factor and safety interlocks. Shown in FIG. 3 is one typical block of information of the tape 36 which comprises the conventional eight column or channel format, having a further column of sprocket holes 38 in alignment with each row of information on the tape. In the mechanical type tape reader the sprocket holes 38 may be utilized as a means of driving the tape to succeeding positions; however, in this photoelectric tape reader, a friction drive is used and the sprocket holes 38 are utilized for providing stepping and synchronizing pulses within the control circuitry.

Twenty-four rows of the eight channel tape are selected as having sufficient capacity to provide one block of information to the machine tool or to control the movement of the slides 14–19 between any two vertical lines 35 as depicted in FIG. 2. The rows of the block of information are assigned to particular machine functions as indicated at the right-hand portion of FIG. 3 and it is this expedient which simplifies to a great extent the necessary circuitry required within the control system for information handling. As noted, slide position information is contained in the first eighteen rows of the block, three rows being allocated to each slide to indicate instantaneous position by three digital numbers. Four channels of the tape 36 are required to provide the digital number in a binary code having a capacity of 16 variations, but the actual code used is the EIA standard RS–244 which can be punched from the keyboard of a standard Friden Flexowriter. Additional channels of the tape are combined in the photoelectric reader to utilize such code and a parity check is utilized in the seventh channel as a control on programming or read out accuracy. The eighth channel 40 of the tape 36 is used only for a stop code indicating the end of a block of information.

Further information is provided in rows 19–23 wherein a single character in binary notation provides the command information for the various spindle speeds, the time interval exponent and the machine mode safety check. Since such information is available in each block of the tape, it is clear that a high degree of versatility is available for the control cycle wherein all such functions may be varied at any point within the cycle.

Figure 4:
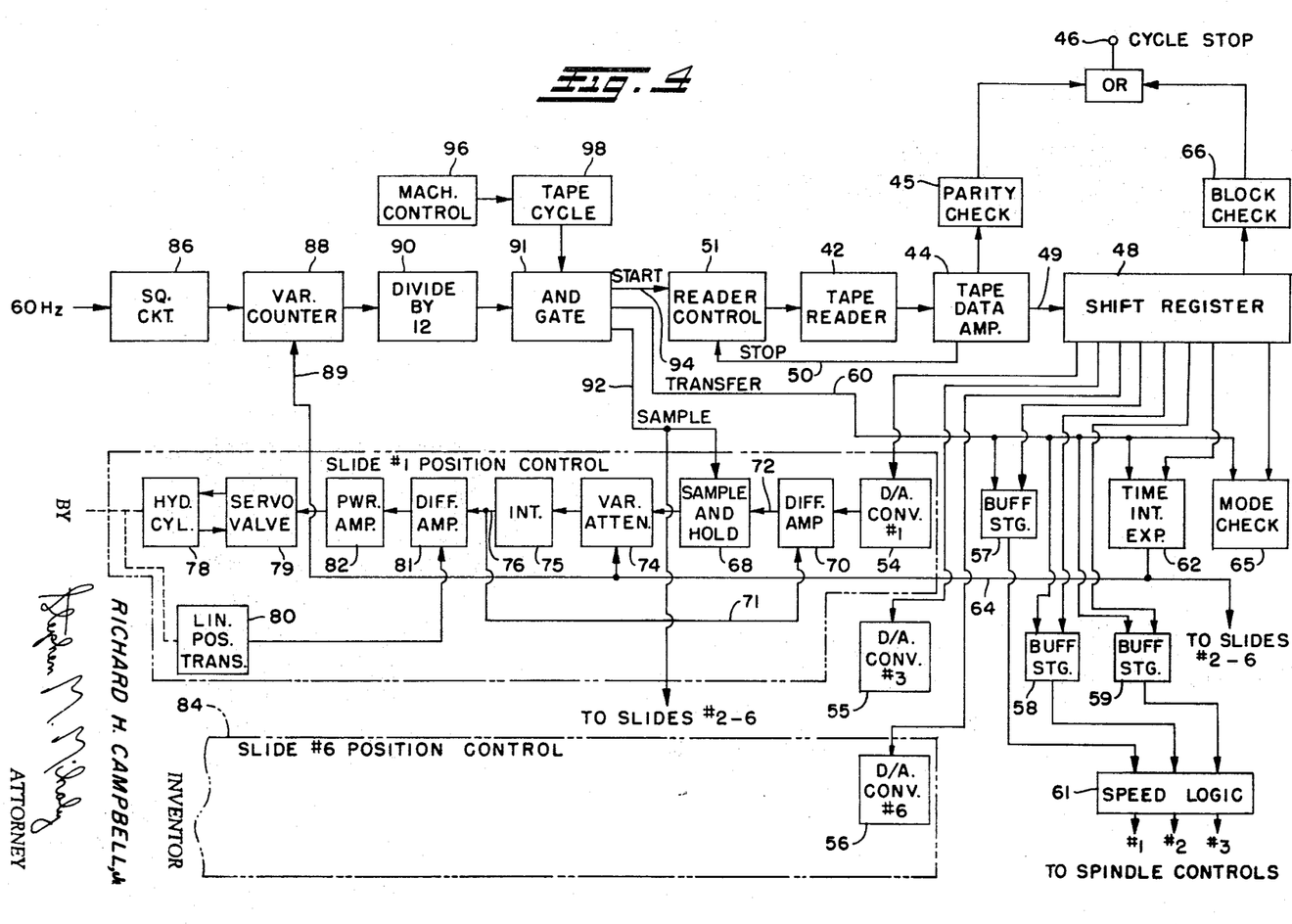
FIG. 4 is a block diagram of the control system of this invention shown in full for one slide and indicating the elements which carry further information for the remaining slides.

Referring now to FIG. 4 and the block diagram of the control system, there are shown the essential components for the control of a single slide of the machine tool. As indicated in FIG. 4, portions of the circuits are common to all slides while the entire control system merely involves a duplication of portions thereof for complete control of the machine tool.

Control information is received from the continuous tape 36 by way of the tape reader 42 which comprises a single row of photocells aligned with the rows of the tape 36 and including a photocell responsive to the light transmitted through the sprocket holes 38. Conventional reading techniques are employed wherein a hole or the absence of a hole indicates the binary notation 1 or 0 and the sprocket hole signal is utilized to recognize the rows of the tape and to provide a signal for information control within the complete system.

Information from each row of the tape is applied in parallel to the tape data amplifier 44 for signal discrimination and shaping. At this point the first check on the recorded signals is performed in the parity check circuit 45 where the number of holes in the tape in each row is determined in a conventional manner and if an error occurs a cycle stop signal will be generated at terminal 46 to prevent further operation of the control system.

The information from the amplifier 44 is then applied to a conventional shift register 48 which in this embodiment comprises four 24bit registers which receive each row of input information in parallel at the input line 49. As noted, once the tape reader 42 is energized interrogation of the information or a reading of the tape will occur in a continuous manner with succeeding rows of information being applied to the input line 49 of the shift register 48. Shifting of the information in the register 48 is performed by the sprocket hole pulse received from the tape data amplifier 44 just prior to the receipt of information from that row of the tape, and will continue until the complete block of information is stored in the 24stages of the shift register 48. Completion of a block of input information is indicated by the appearance of a hole in the eighth channel 40 of the tape, occurring in the twenty-fourth row of each block, being recognized by an amplifier stage in the tape data amplifier 44 and applied as a stop pulse by way of line 50 to the reader control 51.

The information in the shift register 48 appears in the same format as the block of information of the tape 36 described in FIG. 3. The position information contained in the first 18stages of the shift register 48 is applied directly to digital to analog converters 54-56 for all slides on a continuous basis so that analog signals of the desired positions of the slides at each interval are available. Spindle speed information contained in rows 19-21 of the tape 36, and the corresponding stages of the shift register 48, are applied to three buffer storage units 57-59 by means of a transfer pulse on line 60 so that the spindle speed information is available for the complete machining interval. The outputs of the buffer storage units 57-59 are applied to speed logic circuitry 61, which converts the binary command integers into switching functions for application to and control of the electric clutch arrangements of the respective spindle transmissions.

Another buffer register 62 labeled the time interval exponent is connected to receive the information from the 22nd stages of the shift register 48 and serves to retain the timing information for each machining interval, converting the binary input information to a decimal output expression on line 64.

A further register 65 is connected to receive information from the 23rd stages of the shift register 48, this being the mode check circuit. This is a further safety feature of the control system, being programmed in each block of information of the tape 36 and requiring correspondence between the programmed location of spindles 9-11 in the various index stations of the machine tool and their actual location to allow continuation of the machining cycle.

Actual recording of the information on the tape 36 in the shift register 48 is further checked by a block check circuit 66 responsive to information in the last group of stages in the shift register 48. Upon reading in a new block of information, the first stages of the shift register 48 are initially reset to zero condition and this "ghost" information is shifted to the last stages along with entrance of the new block of information for verification there by the AND gate arrangement of the block check circuit 66.

While all such control information is directly available from the shift register 48, it will be appreciated that it is desired to provide a continuous position output signal from the control system for controlling the motion of the respective slides 14-19 and that such information is not continuously available in the shift register 48 as sufficient time must be provided for receipt of the information from the tape 36 which is interrogated on a row by row basis. While the spindle speed and time interval information is retained in the conventional manner, as by the use of buffer registers, the position information is converted immediately to an analog form for further computational operations, thereby reducing appreciably the circuitry required for a complete six slide control system.

Since such position information is available only on an intermittent basis a sample and hold circuit 68 is utilized to retain the information over a period of time to allow the generation of a continuous signal for application to the slide servo and the introduction of succeeding commands into the shift register 48.

Referring again to FIG. 2, once the various curves representing the actual slide movement have been determined by the programmer, he then can, with an intimate knowledge of the machine capabilities and the control system operating characteristics, program the tape 36 to provide information to the control system on a timed basis in order to generate such curves representative of the actual slide position at any instant of time. Thus, the function of the programmer is to subdivide each of the curves into various time intervals of variable duration and program the control system to develop an output signal having a definite rate of change within that interval, to match the desired slide movement, and as a result develop a continuous signal indicative of actual slide position at any point in time.

With reference to the block diagram of FIG. 4, the information received from the tape 36 and available in the shift register 48 is the desired absolute position of the slide at any interval of time, converted to an analog signal at the output of the digital to analog converter 54. Such signal is applied to a difference amplifier 70 for summation with a signal appearing on line 71, representative of the desired slide position at that time, to develop a difference signal on line 72 indicative of the "should move" command to the control system. Such signal is then applied to the sample and hold circuit 68, which once sampling has occurred, no longer requires such input signal so that new information may be introduced into the shift register 48, and the signal is in turn directed to a variable attenuator 74 and integrator 75 combination for generation of the control signal at output line 76. The action of the integrator circuit 75 is to accumulate the series of "should move" signals for development of a continuous signal at the output 76 thereof which is a signal indicative of the instantaneous desired position of the slide. Such desired position signal is then applied as the input to a closed loop position servo, indicated generally at 77 which actuates the slide between its retracted and full-in positions.

The position servo loop 77 is of conventional form and need not be detailed in this description of the invention as its operation is well understood by those skilled in the art. However, such position loop 77 preferably includes a hydraulic actuating cylinder 78 coupled to the slide and servo valve control 79 therefor and an electrical position transducer 80 for generating a signal representative of the actual slide position. In this embodiment of the invention the feedback transducer 80 comprises a precision linear resistor having a slider affixed to the movable portion of the slide 15 and providing an output voltage corresponding to the actual slide position. Such voltage is applied to the difference amplifier 81 for combination with the desired position control signal on line 76 for generation of an error signal, conventional in systems of this type, which then is applied to a power amplifier 82 for control of the servo valve 79.

While no grater details of the position loop servo 77 are necessary for an understanding of this invention, it is apparent that such servo system should be of the high gain type having an operating characteristic suitable for creating actual slide movement closely analogous to that of the desired position as commanded by the desired position input signal 76. Further, the position loop servo 77 must be sufficiently powerful to create such slide movement against considerable and variable machining forces. The hydraulic servo drive arrangement indicated in this disclosure is eminently suited for such application and results in a machine tool having great machining capacity commensurate with accurate dimensioning.

In the complete control system for the machine tool 1 having six machining slides 14–19, duplicate position control components are provided for each of the slides, as indicated by dashed lines 84 in FIG. 4. Each such control is operative to create a continuous control signal and the corresponding slide movement, in the manner described. receiving information from the shift register 48, common to all slides, by way of the respective digital to analog converters 54, 55, 56. Further common components for all slides include the tape reader 42 and control 51, as well as the timing components and others indicated.

For a further understanding of this invention the relation between the generation of the continuous control signals and the timing of operation of the control system, as well as the programming techniques involved, should be considered in more detail.

The action of the integrator circuit 75 is to provide a ramp function output voltage having a slope which is indicative of the desired rate of slide movement in any interval of time as designated by portions of the curves between the vertical lines 35 in FIG. 2. The integrator circuit 75 must further accumulate such discrete voltage quantities into a continuous curve for the control of the slide position servo throughout the machining cycle. The slope of the output curve of the integrator circuit 75 at any instant of time is dependent upon the amplitude of the voltage applied to such integrator circuit, while the attained amplitude of voltage is dependent upon the integration interval. Thus, by controlling both of these factors the output of the integrator 75 can be made to provide the necessary voltage corresponding to the desired slide movement.

The integrator circuit 75 receives such information in two different forms and operates during the cycle with an inherent self-correcting action. Thus, the machine program is set up by determining the spacing between vertical lines 35 in FIG. 2 for various portions of all of the curves 14a–19a. In this manner, the operating sequence of all of the slides 14–19 must be considered simultaneously and a determination made as to which slide has the most critical mode of operation and which therefore will be determinative of the timing intervals for the remainder of the slides. Such programming technique will be followed through for the complete machining cycle, and in the usual situation, the determinations for the most critical slide will vary among the various slides of the machine tool. Thus, for example, in the initial portion of the machining cycle as exemplified by the arbitrary curves shown in FIG. 2, the rapid traverse of slide 17 will be the most critical slide movement encountered as exemplified by the high slope of the curve 17a as indicated at 30. The timing intervals, at this portion of the curve, will be selected to be as long as possible to conserve programming effort, but will be necessarily relatively short in consideration of the linear range of the system and its accuracy of response. The intervals, once determined for the most critical slide portions will then determine the intervals for the remaining slides and the programming of all slides 14–19 may be readily performed by measuring or calculating the intersection of the vertical lines 35 with the respective curves 14a–19a.

As further examples, as slide 17 changes into the feed mode of operation as exemplified by the low slope of curve 17a indicated at 31, a longer time interval could be programmed since the system could accommodate such variation. However, it is noted, during the initial portion of this phase of feed movement of slide 17, that slide 19 is still in a rapid traverse mode and the characteristics of curve 19a will be the most critical thereby determining the timing interval for the remainder of the slides including slide 17.

Thus, although in some instances a greater number of command intervals are programmed for a particular type of movement of a slide, such as the initial portion of the feed movement of slide 17, no deterioration of the response of the slide movement is encountered and a great saving is realized in the complete control system by the common use of timing and related components.

Further, although the programmer must consider the movements of all slides simultaneously no great additional programming time is required as the dimensions required and the time intervals selected are readily determined by means of the graphed representations of the respective slide movements. It is clear also that such a graph of slide movements, while convenient, is not absolutely necessary, as computations of such movements can be made or a skilled programmer can mentally make the comparisons between the instantaneous positions of the slides for determining the timing intervals.

Referring again to FIG. 4, it has been described how the sample and hold circuit 68 performs a time continuation function in sampling the "should move" signal appearing on line 72 and continuously presenting such signal to the variable attenuator 74 and the integrator circuit 75, so that additional information for the next desired position may be entered into the shift register 48. Further, it was described that the operation of the integrator circuit 75 is controlled, so far an amplitude of input signal, by the variable attenuator circuit 74 which presents a portion of the should move signal appearing on line 72. The signal portion is inversely proportional to the command indicative of the time interval appearing in the time interval exponent register 62 and applied by way of line 64 to the variable attenuator 74. It will be clear to those skilled in the art that the slope of the signal appearing at the output of the integrator 75 on line 76 will be proportional to the amplitude of the applied signal from the variable attenuator 74 and that a desired output amplitude corresponding to a desired position for the respective slide will be attained after a preprogrammed time interval. The self-correcting provision of the control system is noted in the application of the should move signal on line 72 to the accumulator portion of the circuit. The desired position signal from the digital to analog converter 54 may not be actually attained by the control system as evidenced by the signal at line 72 within that same interval due to programming considerations, drift problems and the response of the circuit. However, when the next desired position signal is introduced in the next interval, a computation is made in the difference amplifier 70 with the attained signal on line 71, to effect a greater than normal should move signal, resulting in a compensating effect upon the attained signal at the end of that interval. The actual discrepencies involved are relatively small but do place a limitation of the performance of the system.

The linking of the operation of the control system to a real time and the control of the various components of the control system within each programmed interval is under the direction of the timing circuitry appearing at the upper left hand portion of the block diagram of FIG. 4. As indicated, a 60Hz. signal derived from standard power lines is applied to a squaring circuit 86 for wave shaping purposes and then to a variable counter 88 which may be programmed by a signal appearing on line 89 to provide a train of output pulses directly related in time to the 60Hz. line frequency.

The output of the variable counter 88 is applied to the divide by twelve or final counter 90 which as indicated divides the frequency applied by a factor of twelve to provide the desired timing interval for the control system. Both the variable counter 88 and the divide by twelve counter 90 comprise conventional flip-flop arrangements wherein the individual stages are interconnected in various manners to provide a variable count output as controlled by the signal on line 89 for the variable counter 88 and the fixed output of a factor of 1/12 for the final counter 90.

An AND gate 91 is interconnected to the stages of the divide by twelve counter 90 to sense a particular condition of the counter which occurs only once in each interval thereby providing a source of output signals for control of the tape system related to the variable programmed interval received from the divide by twelve counter 90. The particular flip-flop configuration for the divide by twelve counter 90 will only remain for one count received from the variable counter 88 so that the AND gate 91 remains in an energized condition for an interval exactly 1/12 of the programmed interval of control. The output of the AND gate 91 may be considered a pulse occurring on line 92 for energizing the sample and hold circuit 68 of the slide No. 1 position control as well as the sample and hold circuits for the remaining slide position control circuits.

The leading edge of the same pulse on line 92 appears on line 60 as a transfer pulse for storing the information form the shift register 48 in the buffer registers 57–59 as well as the time interval 62 and mode check 65 registers. The trailing edge of the pulse appears on line 94 as a start signal for the reader control 51 to initiate reading of the next block of information for temporary storage in the shift register 48 and for utilization on the next succeeding pulse. The timing is arranged so that the interval from the divide by twelve counter is sufficient to allow complete storage of a block of information in the shift register 48 while being sufficiently short to provide optimum control over the machine slide movements. Typically, such minimum interval would be on the order of 200 milliseconds while the maximum interval obtainable by control of the variable counter 88 is on the order of 25.6 seconds.

Further components of the system indicated in the diagram of FIG. 4 include machine control 96 and tape cycle 98 blocks which merely indicate that the control system can be manually energized or interrupted at any of several points within the system, such energization resulting in a continual recycling of the control system in the described manner until a signal is indicated for a completion of the machining cycle. While such signal could be programmed in the tape 36 at the completion of the cycle, it will be apparent that in many instances it will be desired to employ a continuous tape loop which will repeat the complete machining cycle requiring only some allowance for the introduction of and removal of workpieces from the spindle situated in the work changing station.

Figure 5:
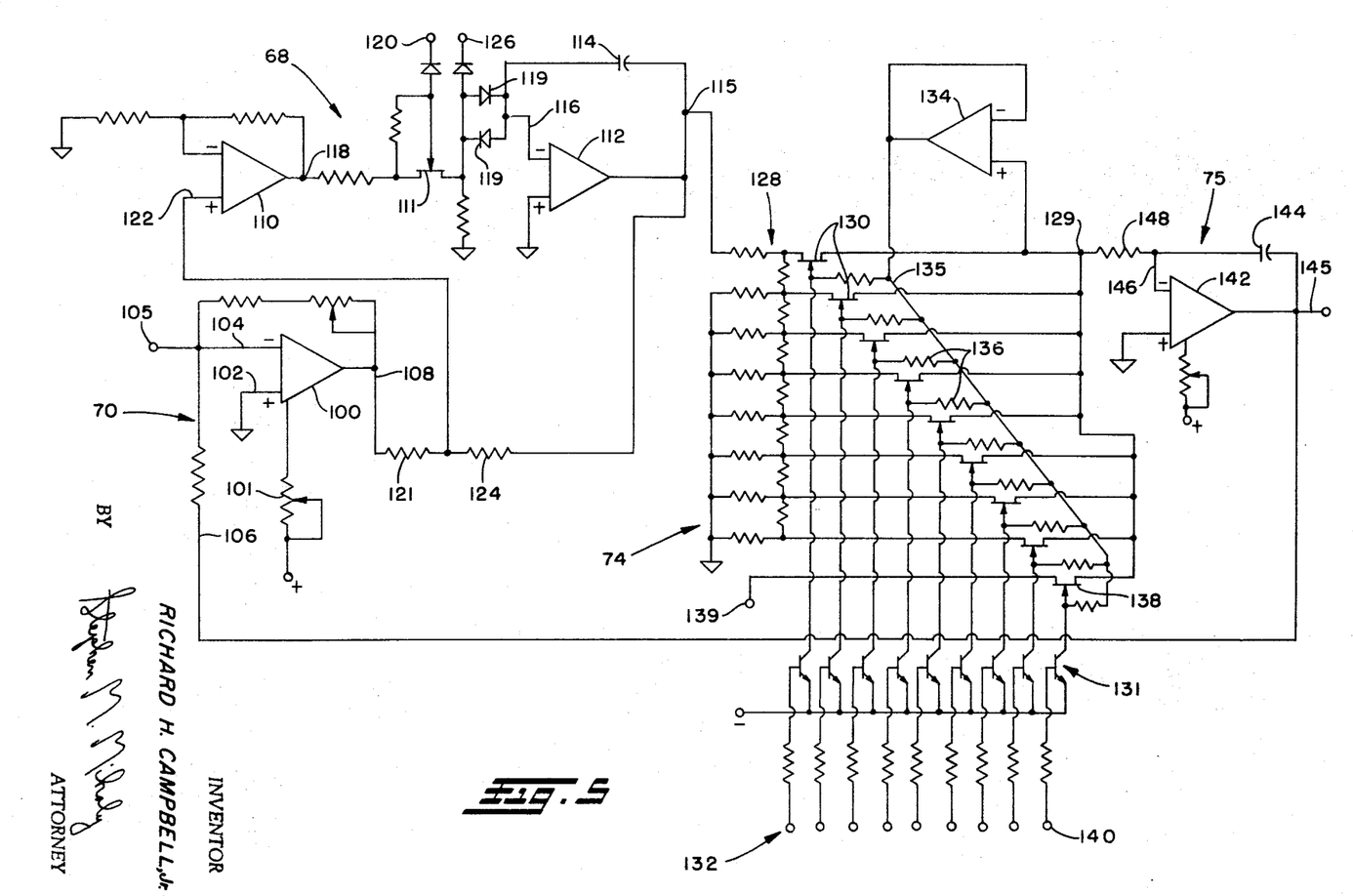
FIG. 5 is a circuit diagram of a portion of the control system, showing primarily the improved sample and hold circuit.

Referring now to FIG. 5 there is shown in greater detail a circuit schematic of a portion of this control system including the novel sample and hold solid state circuit arrangement. The circuit in FIG. 5 is a partial showing of the difference amplifier 70, the sample and hold circuit 68, the variable attenuator 74 and the integrator circuit 75, showing sufficient detail to gain a complete understanding of this portion of the invention.

The active components utilized in this and other portions of the control system comprise operational amplifiers (op (op amps) and discrete transistor and field effect transistor devices. All of these components have characteristics well known in this art and not requiring a detailed discussion here, the op amps being of any type which are characterized as being voltage controlled voltage sources having high input impedance, low output impedance, wide bandwidth and very high gain, being arranged in an amplifying or integrating mode by the interconnection of passive components in the manner well understood in the art.

The should move difference amplifier 70 comprises an op amp 100 connected in the amplifying mode, with a potentiometer 101 connected to an external terminal to control the offset trim of the circuit, and having one input terminal 102 connected to a reference of voltage and the other terminal 104 adapted to receive the input signal. Input current corresponding to the desired position is received directly at terminal 105 from the digital to analog converter 54 and is combined with the prior attained control signal as received on the feedback line 106 for application to op amp terminal 104. The output 108 of the difference amplifier 100 is the should move signal corresponding to the signal appearing on line 72 in FIG. 4.

The sample and hold circuit 68 comprises a hold comparator op amp 110, a field effect transistor switch 111 and a hold integrator op amp 112, the latter having a conventional feedback capacitor 114 connected between output 115 and input 116 to provide an integrating function.

The purpose of the sample and hold circuit 68 is to sample the output 108 of the difference amplifier 70 for a short interval of time comprising 1/12 of the command interval of time. The output of the hold integrator 112 must then present such voltage for the remainder of the interval, or 11/12 of the period, for development of the control signal. In this arrangement of the sample and hold circuit 68, the output 118 of the hold comparator 110 is connected by way of the source and drain terminals of the field effect transistor 111 to the input 116 of the hold integrator 112 via also a series connection of a pair of back to back diodes 119. The characteristic of the field effect transistor 111 is varied between low and high impedance levels by the application of the sample pulse to the gate electrode, such pulse being received at terminal 120.

The output 108 of the difference amplifier 100, as the should move signal, is applied by way of a series fixed resistor 121 to one input 122 of the hold comparator 110. The output 115 of the hold integrator 112 is similarly connected to the same input 122 of the hold comparator 110 by way of another series fixed resistor 124, the polarity of the signals being such as to provide a difference signal at the input terminal 122. The very high gain of the hold comparator 110 will distort the amplitude of the should move signal but the net effect is to provide a high-amplitude signal to the input 116 of the hold integrator 112 so that a rapid development of the signal at the output 115 will be obtained, so long as the field effect transistor 111 is in the "on" condition. The distortion of the signal within the sample and hold circuit 68 is of no consequence as amplification will only occur so long as there is a difference between the output signal from the hold integrator 112 and the should move signal at the output 108 of the difference amplifier, a null being obtained when the output signals are equal.

The characteristics of the sample and hold circuit 68 are further enhanced in this particular configuration, in the purity of output signal at terminal 115, retained over the remainder of the interval when the field effect transistor 111 is in the "off" condition. Thus, even in the "off" condition, the field effect transistor 111 will present a definite impedance and an effect upon the purity of the output 115 of the hold integrator 112 except that the back to back diode arrangement 119 is further included. The diodes 119 provide further isolation in the requirement that the inherent diode voltage drop characteristic is a minimum level of circuit operation. Voltages below this level will be insufficient to cause appreciable conduction through the diodes 119 and thus prevent a discharging of the voltage maintaining capacitor 114. It will be appreciated that the sample and hold circuit 68 must not only retain a specified voltage over the programmed interval, but must be able to change to a new voltage level when a different should move signal is presented and perform such function within the sampling interval. Both positive and negative voltage changes are accommodated by this circuit configuration and the advantageous isolating feature of the back to back diodes 119 and field effect transistor 111 obtains for either condition. A further terminal 126 is indicated as connected to the input 116 of the hold integrator 112 by way of a series diode, such terminal 126 receiving a control voltage from a limit switch circuit associated with the machine tool 1 for overriding biasing or the hold integrator 112 in a particular polarity.

The output 115 of the hold integrator 112 is applied to the variable attenuator 74 comprising a network of resistors indicated generally at 128, the various taps in the network being switched to an output terminal 129 by way of individual field effect transistors 130. The field effect transistors 130 are in turn controlled by the conduction of amplifying transistors 131, receiving at their input terminals 132, the time interval exponent signal of register 62 in decimal form by way of line 64. Only one of the transistor amplifiers 131 will be actuated at any time, energizing the corresponding one of the field effect transistors 130 and applying the respective tap of the voltage divider network 128 to the output terminal 129 thereby providing an output signal having amplitude inversely proportional to the time interval programmed on the tape 36. A voltage follower circuit comprising an op amp 134 is further connected between the output terminal 129 and a common terminal 135 for biasing resistors 136 for the field effect transistors 130 thereby providing a variable bias arrangement for each of the transistors 130. A further field effect transistor 138 is connected as a switch between the output terminal 129 and terminal 139 adapted to receive a variable voltage from manual control circuitry for set up purposes for the machine tool 1. This transistor 138 is energized by the introduction of a signal at input terminal 140 for the transistor amplifiers.

The integrator stage 75 comprises still another operational amplifier 142 having a capacitor 144 connected between output 145 and input 146 terminals and receiving also at the input terminal the voltage from the attenuator circuit 74 by way of a series fixed resistor 148. The characteristic operation of the integrator op amp 142 is well known and comprises the production of a ramp voltage at the output 145 having a slope proportional to the amplitude of the signal applied at terminal 129 for controlling the rate of slide movement and the attained position of the slide.

While the remainder of the circuitry of the complete tape control system is not detailed, it comprises for the most part conventional components connected in typical configurations to perform the desired functions. Such circuitry does, however, employ primarily the operational type amplifiers previously described together with the discrete solid state components such as conventional transistor amplifiers to provide a complete system in a relatively small volume. Further, such circuit arrangement provides the advantages of rapidity of operation with minimal consumption of power resulting in a highly reliable and accurate control system.

I, therefore, particularly point out and distinctly claim as my invention:

1. A control system for a machine tool wherein discrete input information is converted to actual machine movement, comprising means for presenting the input information in serial form upon demand, means for accumulating such information for formation of an interim signal, means for sampling and retaining the interim signal for a variable time interval, means operatively connected to said sampling and retaining means for generating a continuous control signal as a function of the interim signal for application to an operative portion of the machine tool, said generating means being operative to vary the control signal at a variable rate within a variable interval as preselected to provide a predetermined curve for such control signal, and timing means responsive to preprogrammed information for generating such timing intervals and for actuating said presenting means in a predetermined manner.

2. A control system as set forth in claim 1 wherein said accumulating means comprises a difference amplifier for comparing the input information and a signal representative of the machine movement for formation of the interim signal.

3. A control system as set forth in claim 2 wherein the control signal of said generating means is the signal representative of machine movement.

4. A control system as set forth in claim 3 wherein said generating means comprises an integrator and variable attenuator circuit, said attenuator circuit being responsive to preprogrammed timing information for applying a portion of the interim signal to said integrator circuit, such portion being inversely proportional to the timing interval of the control system.

5. A control system as set forth in claim 4 wherein all preprogrammed timing and position information is presented to the control system from a tape and tape reader combination, said tape reader being controlled at a definite time within the variable timing interval.

6. A system for controlling the movement of a reciprocable slide of a machine tool during a machining operation in which a tool mounted on such slide is brought into communication with a workpiece rotatively supported on a spindle of the machine tool comprising a tape and tape reader mechanism for introducing command information to the control system on a step-by-step basis, a shift register for accumulating the information for a single machining interval from said tape and reader mechanism and for distributing such information to various portions of the system, means operatively connected to said shift register for controlling spindle speed of the machine tool in response to a predetermined command introduced to the system, means operatively connected to said shift register for converting digital position information contained therein to an analog signal having an amplitude proportional to such information, means for comparing the analog signal with a control signal representative of desired slide position and for developing a difference signal, sample and hold means connected to said comparing means for retaining such difference signal for an interval of time, integrator means responsive to the output of said sample and hold means for integrating such signal over a predetermined interval of time to generate said control signal indicative of the desired instantaneous position of the slide, a closed position loop servo adapted to receive the control signal and actuate the slide correspondingly, and means for generating timing signals for application to the system to activate said tape and tape reader mechanism, said shift register and said sample and hold circuit in a predetermined manner, whereby a continuous control signal is developed for application to said servo form discrete digital information contained on said tape.

7. Apparatus for automatic control of a machine tool element, comprising means for developing groups of digital signals from programmed information, each signal group being representative of an absolute position in the path of movement of the machine element and the time interval in which to attain such position, means for converting said digital position signals to an analog format, means for combining said analog position signals with a desired position signal to develop a difference signal, said desired position signal being continuously representative of the desired position of the machine element, a sample and hold circuit for retaining said difference signal over the time interval for movement of the machine element, variable timing means responsive to said time interval signals for controlling said digital signal developing means and for controlling the intervals of operation of said sample and hold circuit, a variable attenuator for modifying said retained difference signal as a function of the time interval signal, a circuit for integrating the modified difference signal to develop the desired position signal for the machine element, and a servo system for continuously actuating said machine element in response to said desired position signal.

8. Apparatus as set forth in claim 7 wherein said variable timing means comprises a variable frequency pulse generator, and a counter for developing signals at predetermined counts thereof, said signals being applied to said digital signal developing means and said sample and hold circuit for operation in a predetermined manner.

9. Apparatus as set forth in claim 8 wherein said pulse generator comprises a source of timing signals, and a variable counter adapted for receipt of said timing signals for developing a train of pulses for application to said first recited counter, said variable counter being responsive to said time interval signals for modifying the rate of pulses in the train of pulses.

10. Apparatus as set forth in claim 9 wherein said digital signal developing means comprises a tape and tape reader combination operative in response to a signal from said first recited counter for reading a block of information on said tape, and a register for retaining such information in the form of digital signals for application to said converting means and for control of said variable counter and said variable attenuator.

11. Apparatus for developing an analog control signal having a time-amplitude configuration representative of desired movement of a movable element, for application to a position loop servo system for controlling such element, comprising means for reading programmed digital information representative of a series of desired positions for such element and the time intervals in which to attain such positions, said reading means being operative to read and retain the information in digital format for each successive position in response to a start signal, means for converting said position signal to an analog position signal, means for combining said analog position signal with said analog control signal to develop a difference signal, means for attenuating said difference signal as a function of said time interval signal, means for integrating said attenuated difference signal to develop said analog control signal, and means for generating said start signal at a time determined by said time interval signal, said start signal being applied to said reading means to obtain the digital information of a succeeding position and time interval.

12. Apparatus as set forth is claim 11 wherein said reading means comprises a tape reader and shift register for accumulating the programmed information for one desired position and further including a register operatively connected to said shift register for storing said time interval signal in response to a transfer signal, a sample and hold circuit for retaining said difference signal in response to a sample signal, said generating means being operative to generate said start, transfer and sample signals in a predetermined sequence and at times determined by said time interval signal.

13. Apparatus as set forth in claim 12 wherein said generating means comprises a digitally controlled variable frequency pulse generator and counter combination, the frequency of operation of said pulse generator being controlled by said time interval signal and said counter being operative to provide said start, transfer and sample signals at predetermined counts thereof.

14. Apparatus as set forth in claim 13 wherein said integrating means comprises an operational amplifier connected in an integrating mode and said attenuating means comprises a digitally controlled voltage divider network responsive to said time interval signal of said time interval signal storage register.